United States Patent
Dalrymple

(10) Patent No.: US 9,949,600 B1
(45) Date of Patent: Apr. 24, 2018

(54) MINI-BLIND CLEANER

(71) Applicant: Margaret Dalrymple, Riverview, FL (US)

(72) Inventor: Margaret Dalrymple, Riverview, FL (US)

( * ) Notice: Subject to any disclaimer, the term of this patent is extended or adjusted under 35 U.S.C. 154(b) by 0 days.

(21) Appl. No.: 15/665,910

(22) Filed: Aug. 1, 2017

(51) Int. Cl.
  *A47L 4/04*  (2006.01)
  *F16M 11/26*  (2006.01)

(52) U.S. Cl.
  CPC ............... *A47L 4/04* (2013.01); *F16M 11/26* (2013.01)

(58) Field of Classification Search
  CPC ................................ A47L 4/04; F16M 11/26
  See application file for complete search history.

(56) References Cited

U.S. PATENT DOCUMENTS

| | | | |
|---|---|---|---|
| 1,315,656 A * | 9/1919 | Burgener | .............. A47L 4/04 15/268 |
| 2,588,557 A | 3/1952 | Morris | |
| 2,598,798 A | 6/1952 | Kerr | |
| 2,763,024 A | 9/1956 | Sidney | |
| 2,849,745 A | 9/1958 | Madsen | |
| 2,996,747 A | 8/1961 | Lori | |
| 3,130,439 A | 4/1964 | Bovaird | |
| 4,934,015 A | 6/1990 | Mink | |
| 5,056,184 A * | 10/1991 | Pitchford | .............. A47L 4/04 15/268 |
| D391,706 S | 3/1998 | Malcolm | |
| 6,112,914 A | 9/2000 | Naficy | |
| 6,729,509 B1 * | 5/2004 | Fabian | .............. A47G 25/50 223/85 |
| 7,530,543 B1 | 5/2009 | Kremzar | |

FOREIGN PATENT DOCUMENTS

CA  2300024 A1  9/2001

* cited by examiner

*Primary Examiner* — Randall Chin
(74) *Attorney, Agent, or Firm* — Kyle A. Fletcher, Esq.

(57) ABSTRACT

The mini-blind cleaner is an open framework from which a mini-blind to be cleaned may be suspended. Suspending the mini-blind from the mini-bland cleaner allows both sides of the mini-blind to be accessed and allows operation of the mini-blind mechanisms that raise and lower the blind and tilt the slats of the mini-blind. The mini-blind cleaner comprises telescopic upright sides that may be reduced in length. The upright sides are also hinged to the top frame so that the mini-blind cleaner may be folded flat for storage or transportation. Movable blind brackets on the top frame lock into position at spacings corresponding to standard blind lengths.

20 Claims, 6 Drawing Sheets

US 9,949,600 B1

MINI-BLIND CLEANER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of household cleaning tools, more specifically, a stand to hold a mini-blind while the mini-blind is being cleaned.

A mini blind is a type of window covering comprising a plurality of horizontal slats suspended from a mounting base by an arrangement of strings. The slats may be rotated simultaneously between a parallel alignment of all slats (which effectively 'opens' the mini-blind to allow light in) and an alignment where the slats touch each other at the edges of the slats (which effectively 'closes' the mini-blind and blocks light from entering) by moving the strings.

SUMMARY OF INVENTION

The mini-blind cleaner is an open framework from which a mini-blind to be cleaned may be suspended. Suspending the mini-blind from the mini-bland cleaner allows both sides of the mini-blind to be accessed and allows operation of the mini-blind mechanisms that raise and lower the blind and tilt the slats of the mini-blind. The mini-blind cleaner comprises telescopic upright sides that may be reduced in length. The upright sides are also hinged to the top frame so that the mini-blind cleaner may be folded flat for storage or transportation. Movable blind brackets on the top frame lock into position at spacings that correspond to standard blind lengths.

An object of the invention is to suspend a mini-blind in an accessible position while it is being cleaned.

Another object of the invention is to allow full operation of the mini-blind mechanism for raising, lowering, and tilting the mini-blind.

Yet another object of the invention is to provide a mini-blind cleaner that can be collapsed and folded to a smaller form factor for moving and storing.

A further objection of the invention is to provide movable blind brackets which lock into position at spacings corresponding to standard min-blind lengths.

These together with additional objects, features and advantages of the mini-blind cleaner will be readily apparent to those of ordinary skill in the art upon reading the following detailed description of the presently preferred, but nonetheless illustrative, embodiments when taken in conjunction with the accompanying drawings.

In this respect, before explaining the current embodiments of the mini-blind cleaner in detail, it is to be understood that the mini-blind cleaner is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mini-blind cleaner.

It is therefore important that the claims be regarded as including such equivalent construction insofar as they do not depart from the spirit and scope of the mini-blind cleaner. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive. As used herein, the term "telescopic leg" refers to an armature that comprises two or more straight, hollow segments of different diameters joined by telescopic joints. As used herein, the term "telescopic joint" refers to a coupling between two leg segments of different diameters where an outside diameter of a first leg segment is not larger than the inside diameter of a second leg segment, the first segment slides into the second segment, the first segment comprises a spring loaded button, and the second segment comprises a side hole wherein at a point of maximum extension of the first segment the spring loaded button of the first segment pops into the side hole of the second segment and prevents further sliding of the segments. To shorten the leg, the button may be pressed into the side hole while attempting to slide the first segment into the second segment.

Figure 1:
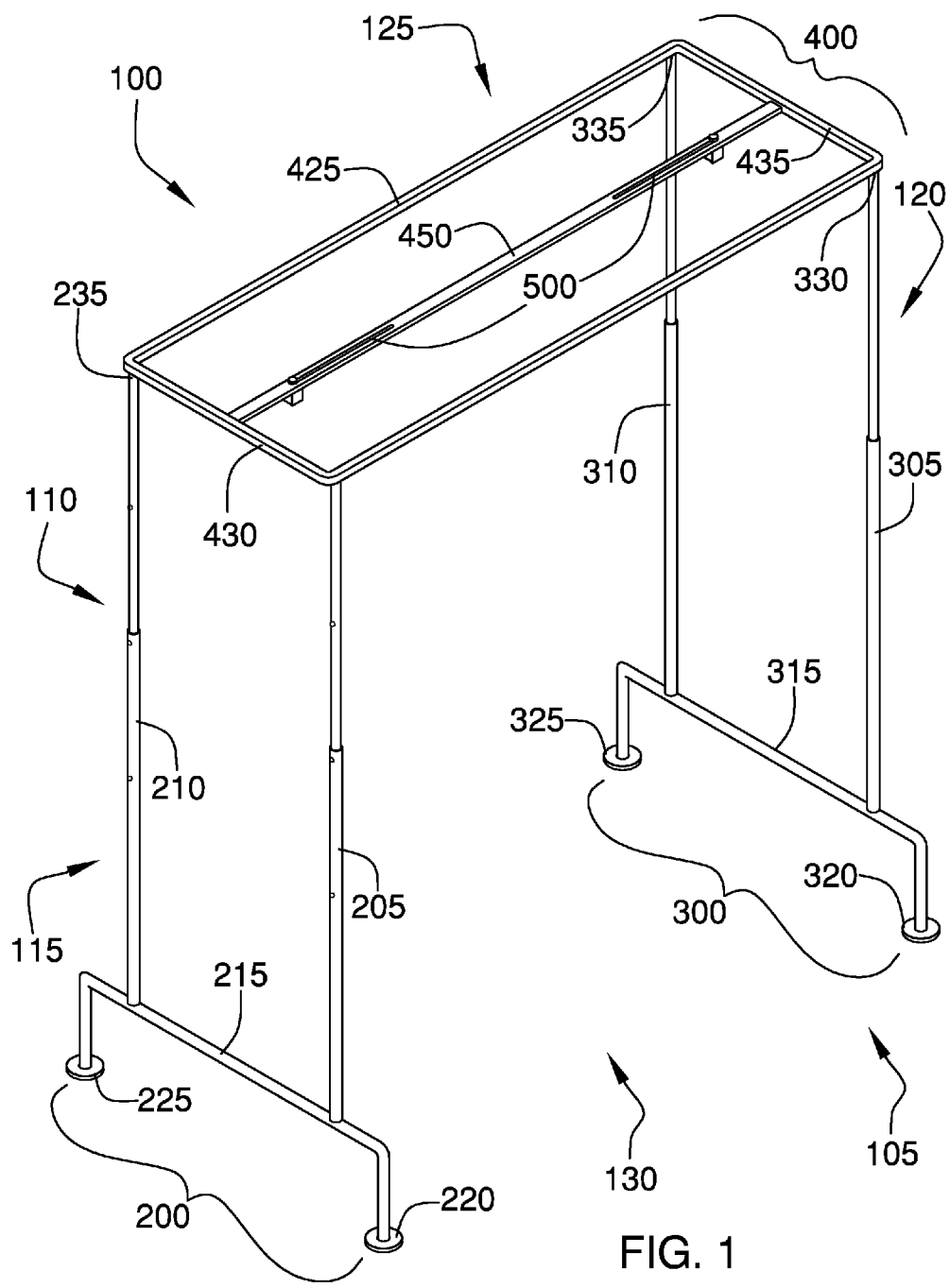
FIG. 1 is a perspective view of an embodiment of the disclosure.
Figure 2:
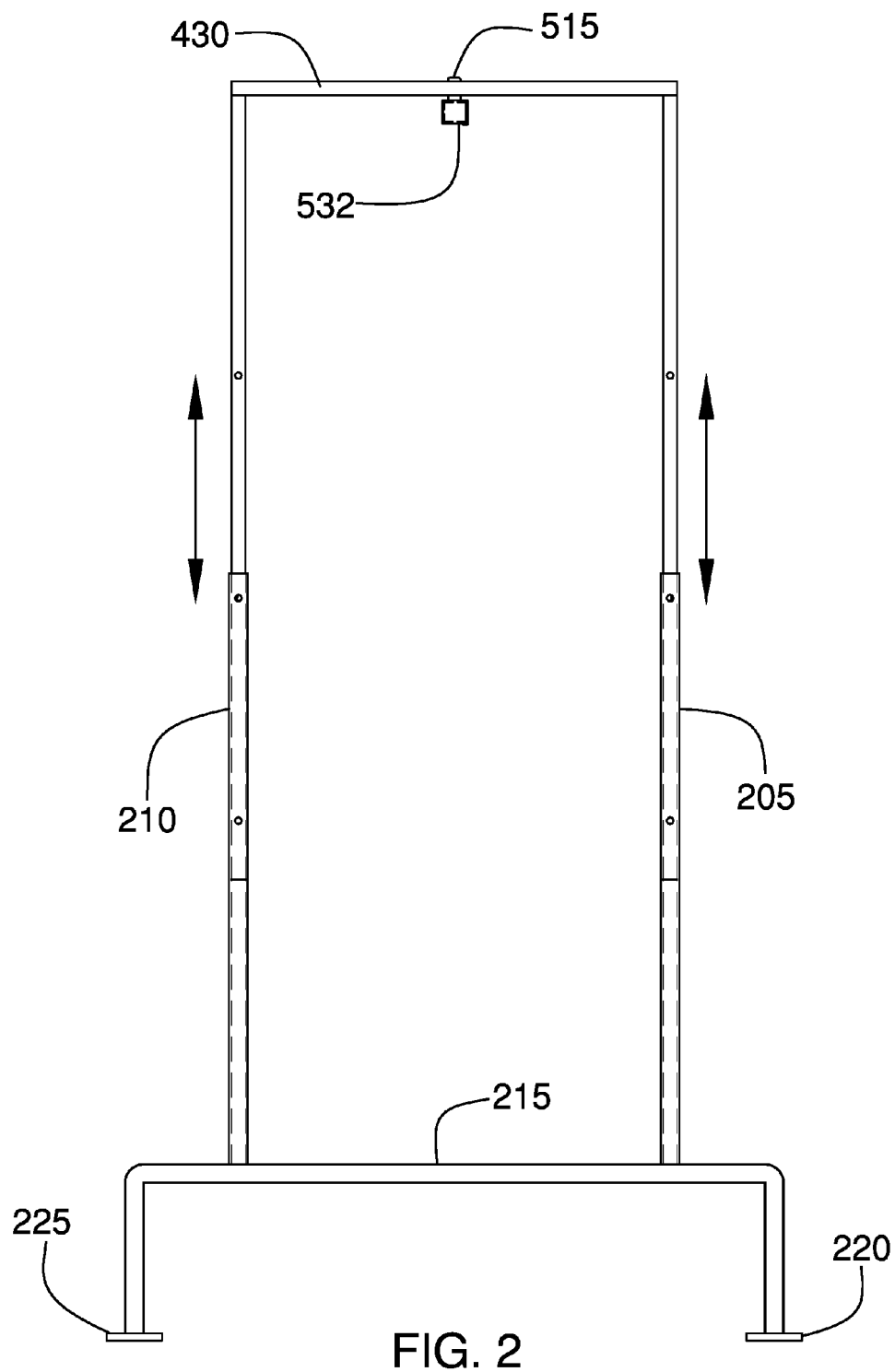
FIG. 2 is a side view of an embodiment of the disclosure.
Figure 3:
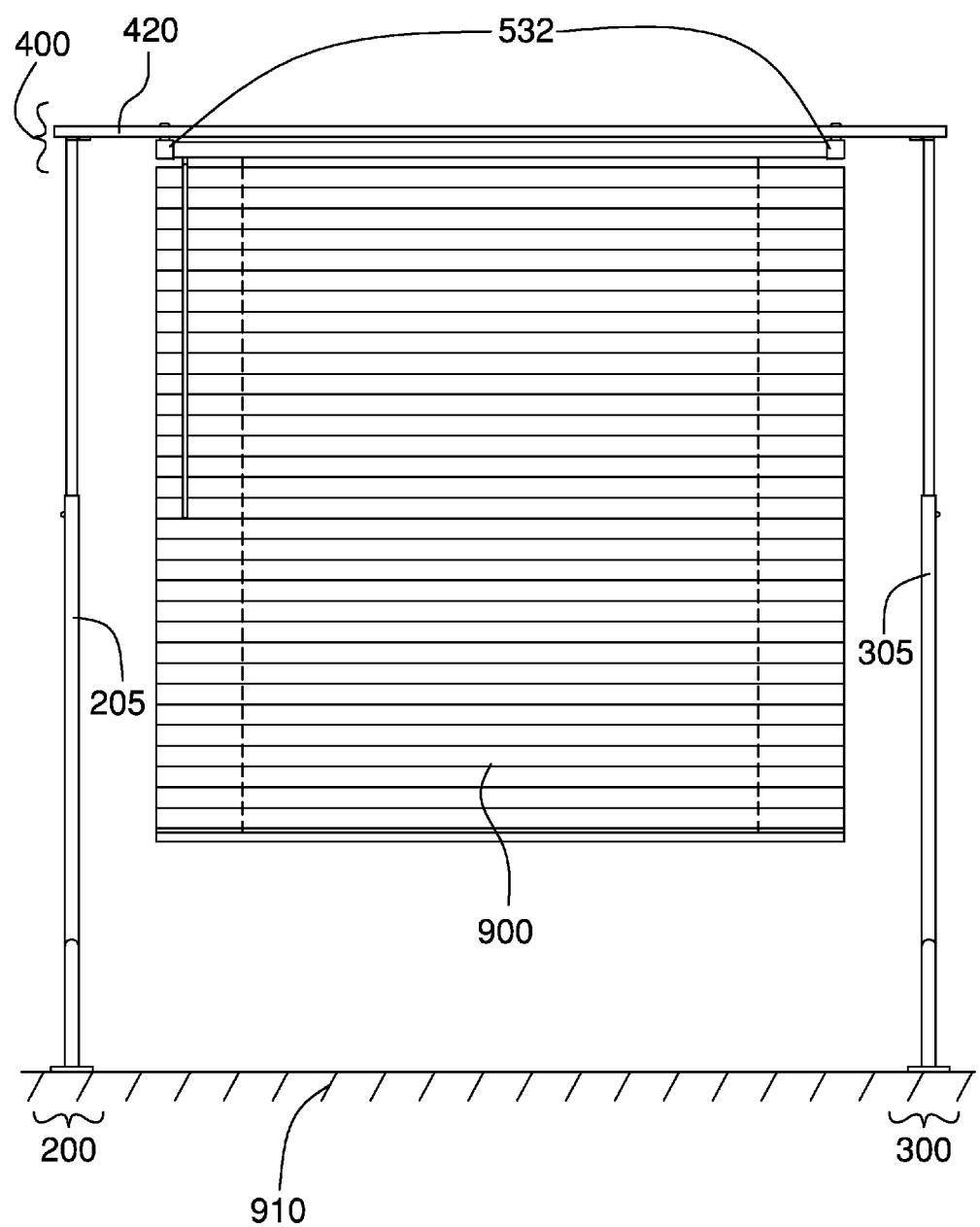
FIG. 3 is a front view of an embodiment of the disclosure showing a mini-blind suspended for cleaning.
Figure 4:
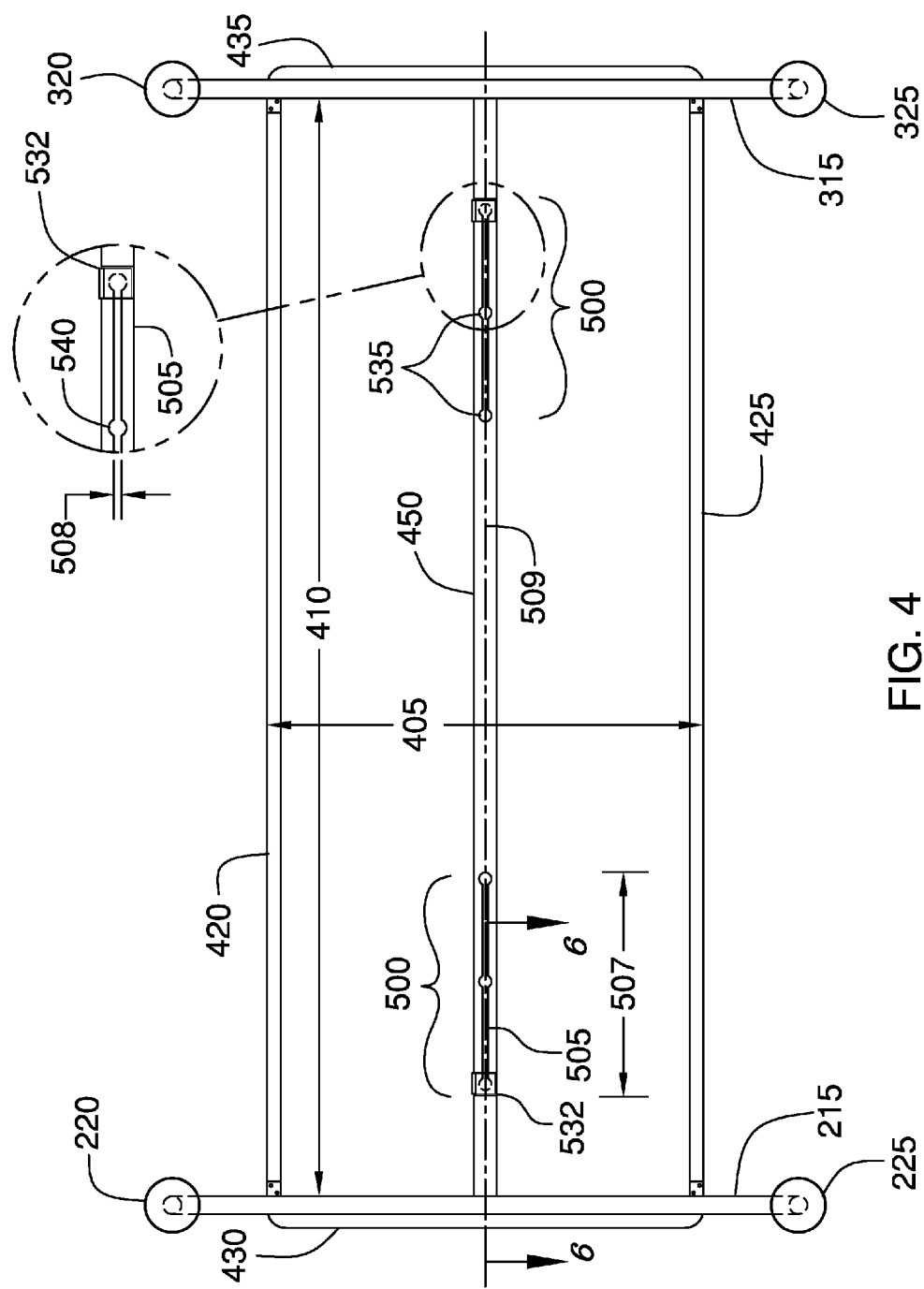
FIG. 4 is a bottom view of an embodiment of the disclosure.
Figure 5:
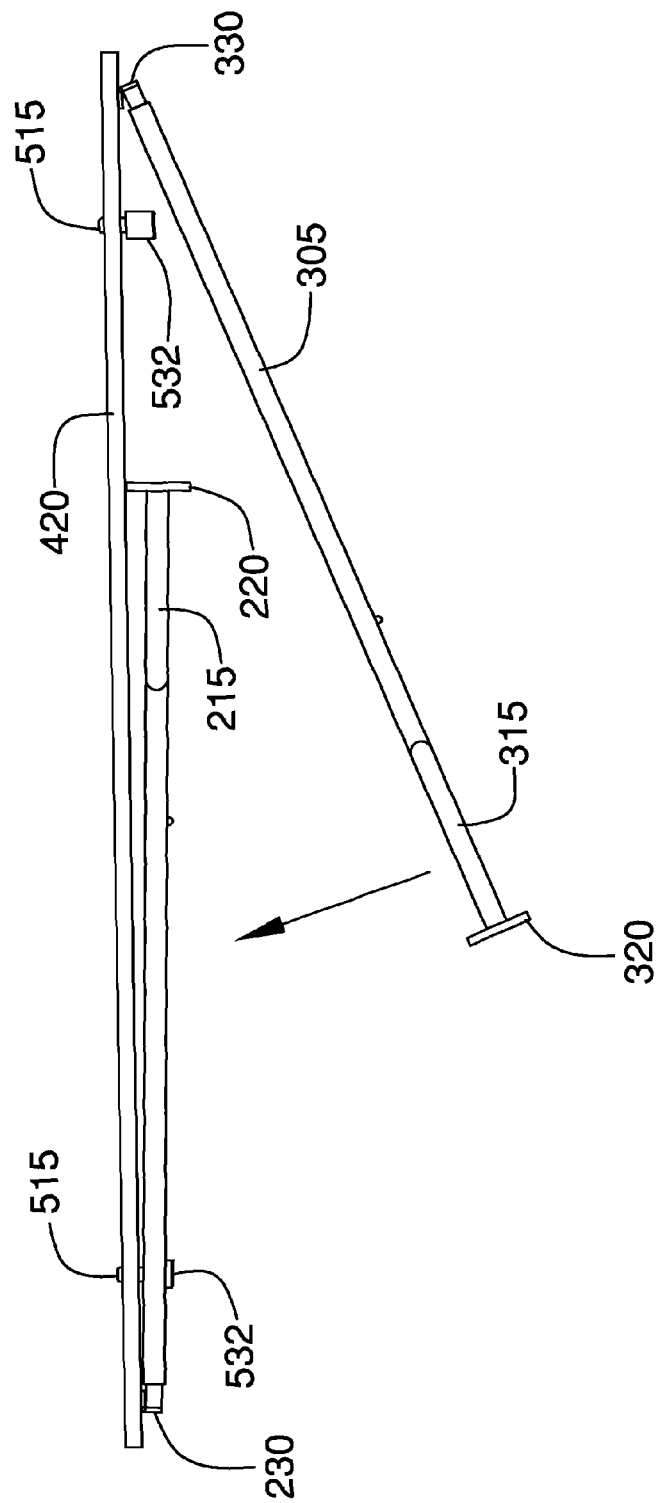
FIG. 5 is a detail view of an embodiment of the disclosure showing the framework collapsed and folded for transportation or storage.
Figure 6:
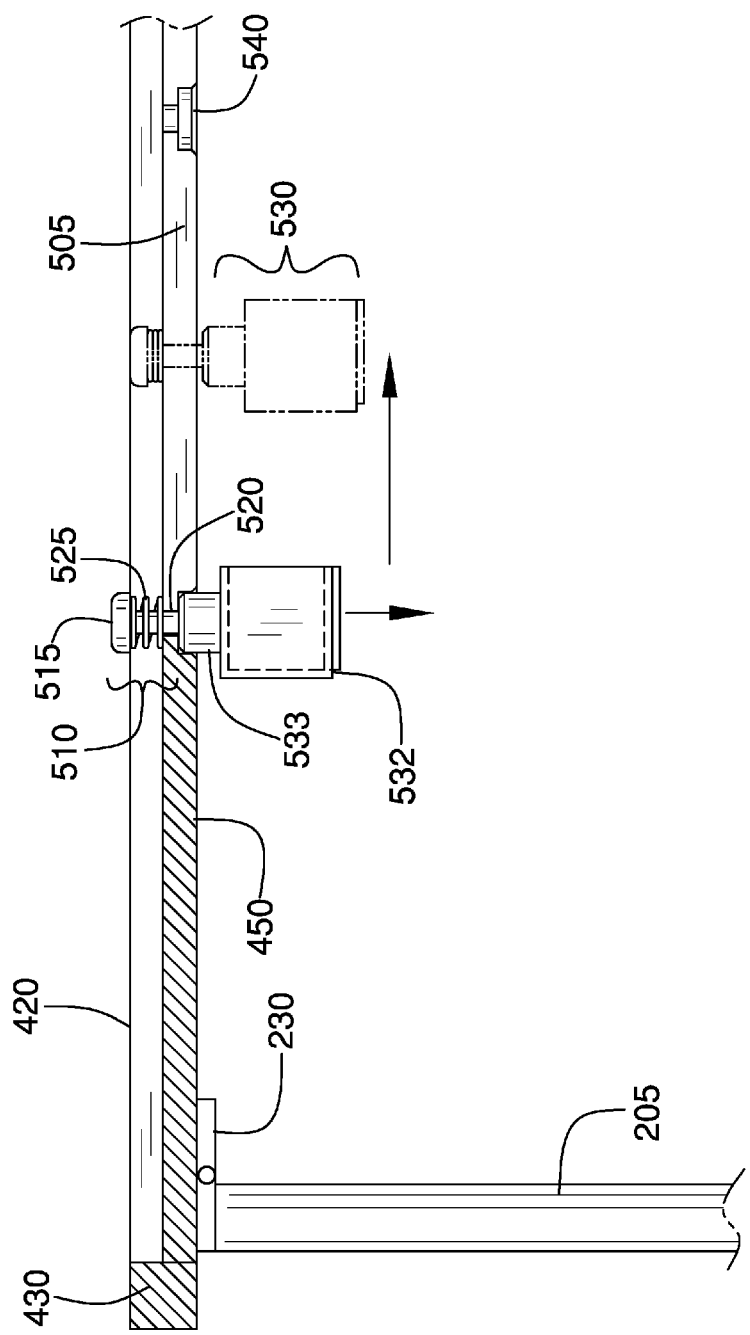
FIG. 6 is a cross-sectional view of an embodiment of the disclosure across 6-6 as shown in FIG. 4.

Detailed reference will now be made to a first potential embodiment of the disclosure, which is illustrated in FIGS. 1 through 6.

The mini-blind cleaner 100 (hereinafter invention) comprises a left side frame 200, a right side frame 300, and a top frame 400. The invention 100 is a framework upon which a mini-blind 900 may be hung for access to both sides while being cleaned. Two blind holder mechanisms 500 on the top frame 400 may adjust the separation of blind brackets 530 to accommodate blinds of different sizes. The left side frame 200 and the right side frame 300 are telescopic and hinged so that the invention 100 may be collapsed and folded for storage and transportation. The invention 100 has a front side 105, a rear side 110, a left side 115, a right side 120, a top 125, and a bottom 130.

The left side frame 200 comprises a left front upright 205, a left rear upright 210, a left frame base 215, a left front foot 220, a left rear foot 225, a left front hinge 230 and a left rear hinge 235. The left frame base 215 may be an inverted, U-shaped element at the bottom of the left side frame 200. The two ends of the left frame base 215 couple to the left front foot 220 and to the left rear foot 225. When the invention 100 is being used, the left front foot 220 and the left rear foot 225 rest on the ground 910. The length of the horizontal part of the left frame base 215 may be 50% to 100% of the height of the left front upright 205 to give the invention 100 stability when it is being used. In some embodiments, the length of the horizontal part of the left frame base 215 may be 36 to 72 inches.

The left front upright 205 may be a telescopic leg which couples to the left frame base 215 on a bottom end of the left front upright 205 and which hingedly couples to the top frame 400 on a top end of the left front upright 205. The left rear upright 210 may be a telescopic leg that couples to the left frame base 215 on a bottom end of the left rear upright 210 and hingedly couples to the top frame 400 on a top end of the left rear upright 210. The left front upright 205 and the left rear upright 210 may comprise two or more segments in each telescopic leg. In some embodiments, the left front upright 205 and the left rear upright 210 may each have a height of 5 to 6 ft when fully extended, the left front upright 205 and the left rear upright 210 may each have a height of 12 to 36 inches when fully collapsed, and the left front upright 205 and the left rear upright 210 may each comprise 2 to 5 telescopic leg segments.

The spacing between the points on the left frame base 215 where the left front upright 205 and the left rear upright 210 couple to the left frame base 215 matches a depth of the top frame 405.

The top of the left front upright 205 may be hingedly coupled to the left, front corner of the top frame 400 by the left front hinge 230. The top of the left rear upright 210 may be hingedly coupled to the left, rear corner of the top frame 400 by the left rear hinge 235. When the invention 100 is to be transported or stored, the left side frame 200 may be reduced in size by collapsing the left front upright 205 and the left rear upright 210 using the telescopic joints and then the left side frame 200 may be folded by rotating the left side frame 200 around the left front hinge 230 and the left rear hinge 235 towards the top frame 400.

The right side frame 300 comprises a right front upright 305, a right rear upright 310, a right frame base 315, a right front foot 320, a right rear foot 325, a right front hinge 330 and a right rear hinge 335. The right side frame 300 may be constructed the same as the left side frame 200—it may simply be turned 180 degrees before installing on the invention 100. The right frame base 315 may be an inverted, U-shaped element at the bottom of the right side frame 300. The two ends of the right frame base 315 couple to the right front foot 320 and to the right rear foot 325. When the invention 100 is being used, the right front foot 320 and the right rear foot 325 rest on the ground 910. The length of the horizontal part of the right frame base 315 may be 50% to 100% of the height of the right front upright 305 to give the invention 100 stability when it is being used. In some embodiments, the length of the horizontal part of the right frame base 315 may be 36 to 72 inches.

The right front upright 305 may be a telescopic leg which couples to the right frame base 315 on a bottom end of the right front upright 305 and which hingedly couples to the top frame 400 on a top end of the right front upright 305. The right rear upright 310 may be a telescopic leg that couples to the right frame base 315 on a bottom end of the right rear upright 310 and hingedly couples to the top frame 400 on a top end of the right rear upright 310. The right front upright 305 and the right rear upright 310 may comprise two or more segments in each telescopic leg. In some embodiments, the right front upright 305 and the right rear upright 310 may each have a height of 5 to 6 ft when fully extended, the right front upright 305 and the right rear upright 310 may each have a height of 12 to 36 inches when fully collapsed, and the right front upright 305 and the right rear upright 310 may each comprise 2 to 5 telescopic leg segments.

The spacing between the points on the right frame base 315 where the right front upright 305 and the right rear upright 310 couple to the right frame base 315 matches the depth of the top frame 405.

The top of the right front upright 305 may be hingedly coupled to the right, front corner of the top frame 400 by the right front hinge 330. The top of the right rear upright 310 may be hingedly coupled to the right, rear corner of the top frame 400 by the right rear hinge 335. When the invention 100 is to be transported or stored, the right side frame 300 may be reduced in size by collapsing the right front upright 305 and the right rear upright 310 using the telescopic joints and then the right side frame 300 may be folded by rotating the right side frame 300 around the right front hinge 330 and the right rear hinge 335 towards the top frame 400.

The top frame 400 comprises a front frame bar 420, a rear frame bar 425, a left frame bar 430, a right frame bar 435 and a center bar 450. The top frame 400 is the topmost framework of the invention 100. The top frame 400 may be supported off the ground 910 by the left side frame 200 and the right side frame 300. The front frame bar 420, the rear frame bar 425, the left frame bar 430, and the right frame bar 435 form an outer frame that couples to the left side frame 200 and the right side frame 300 and provide rigidity for the invention 100. The length of the left frame bar 430 and the right frame bar 435 determine the depth of the top frame 405. The length of the front frame bar 420 and the rear frame bar 425 determine a width of the top frame 410. In some embodiments, the depth of the top frame 405 may be between 24 and 64 inches and the width of the top frame 410 may be between 48 and 72 inches.

The mini-blind 900 that is being cleaned may be suspended from the center bar 450. The center bar 450 is an armature that couples to the middle of the top frame 400. Specifically, the ends of the center bar 450 couple to the center of the left frame bar 430 and to the center of the right frame bar 435. The center bar 450 is located midway between the front frame bar 420 and the rear frame bar 425 and runs parallel to the front frame bar 420 and to the rear frame bar 425.

The center bar 450 comprises the two blind holder mechanisms 500. One of the two blind holder mechanisms 500 is located at the center of the left half of the center bar 450 and the other one of the two blind holder mechanisms 500 is located at the center of the right half of the center bar 450. Each of the two blind holder mechanisms 500 are identical except for being reversed left-to-right due to their opposing positions on the center bar 450.

Each of the two blind holder mechanisms 500 individually comprise a pin slot 505, an adjustment pin 510, a spring 525, the blind bracket 530, and a plurality of adjustment stops 535.

The pin slot 505 may be a linear cutout along a longitudinal axis of the center bar 509, open from top to bottom. The adjustment pin 510 may slide along the center bar 450 within the extent of the pin slot 505. A length of the pin slot 507 is measured from one end of the pin slot 505 to the other end of the pin slot 505 along the longitudinal axis of the center bar 509. A width of the pin slot 508 is measured from one side of the pin slot 505 to the other side of the pin slot 505 in a direction that is perpendicular to the longitudinal axis of the center bar 509 and oriented front-to-back. The plurality of adjustment stops 535 are disposed along the pin slot 505. Each of the plurality of adjustment stops 535 comprise an indentation 540 in the center bar 450 open from below and centered on a location along the pin slot 505.

The adjustment pin 510 comprises an adjustment pin head 515 and an adjustment pin shaft 520. The adjustment pin head 515 has a diameter that is wider than the width of the pin slot 508. The adjustment pin head 515 prevents the adjustment pin 510 from falling through the pin slot 505. The adjustment pin shaft 520 is narrower than the width of the pin slot 508 and may therefore move along the pin slot 505. The adjustment pin shaft 520 extends downward from the adjustment pin head 515 to the blind bracket 530, passing through the pin slot 505. The bottom of the adjustment pin shaft 520 is coupled to the top of the blind bracket 530. Between the adjustment pin head 515 and the blind bracket 530, the spring 525 encircles the blind bracket 530.

The spring 525 lifts the adjustment pin 510 which in turn lifts the blind bracket 530 attached to it. When the blind bracket 530 is lifted, a lock extension 533 on the blind bracket 530 may engage one of the indentations 540 of the plurality of adjustment stops 535. The blind bracket 530 may be moved by pulling down on the blind bracket 530, sliding it to a pre-defined position where one of the indentation 540 has been placed, and releasing the blind bracket 530. When released, the spring 525 will pull it up and when the lock extension 533 seats in the indentation 540 the blind bracket 530 will not slide.

The blind bracket 530 comprises a blind receiver 532 and the lock extension 533. The blind receiver 532 is a hollow cube with one vertical side missing. The missing side is oriented towards the center of the invention 100, facing a comparable blind bracket located on the other one of the two blind holder mechanisms 500. The end of the mini-blind 900 may be slid into the blind receiver 532 and will be supported by the blind receiver 532. If two of the blind brackets 530, one on the left side of the center bar 450 and one on the right side of the center bar 450, are positioned at a specific separation distance corresponding to the length of the mini-blind 900, the mini-blind 900 may be held at both ends by the blind brackets 530 and the mini-blind 900 may be suspended from the center bar 450.

The lock extension 533 is a cylindrical upward extension of the blind bracket 530. The diameter of the lock extension 533 is smaller than the diameter of the indentation 540 in the plurality of adjustment stops 535. When the spring 525 pushes the adjustment pin head 515 up and thereby lifts the blind bracket 530, the lock extension 533 may slide into the indentation 540. When the lock extension 533 is in the indentation 540, the blind bracket 530 is prevented from sliding along the center bar 450.

The plurality of adjustment stops 535 comprises two or more of the indentations 540 at predetermined positions along the pin slot 505. The predetermined positions are selected so that the distance between a specific one of the indentations 540 on the left side of the center bar 450 and a complementary one of the indentations 540 on the right side of the center bar 450 corresponds to a standard length of a mini-blind. If the blind brackets 530 are moved to those positions, the mini-blind 900 will fit within the blind brackets 530 at each end and the lock extensions 533 seated into the indentations 540 at those positions will prevent the blind brackets 530 from moving.

In use, the invention 100 is moved to a location where it is desired to clean the mini-blind 900. In some instances, this may be an outdoor location where dust from the mini-blind 900 and water sprayed from a hose will be less of an issue. The invention 100 is erected by unfolding the left side frame 200 and unfolding the right side frame 300 and by fully extending the left front upright 205, the left rear upright 210, the right front upright 305, and the right rear upright 310. The blind bracket 530 on one side of the center bar 450 may be pulled down, slid to a desired position, and the blind bracket 530 may be released to lock it in place. One end of the mini-blind 900 may be slid into the blind bracket 530. The mini-blind 900 may be lifted into a position that is parallel and just under the center bar 450. The blind bracket 530 on the other side may be pulled down, slid towards the mini-blind 900 and over the free end of the mini-blind 900, and the blind bracket 530 may be released to lock it in place. With the mini-blind 900 now suspended from the center bar 450, the mini-blind 900 may be dusted, wiped, sprayed, and otherwise cleaned from both sides. If desired, the mini-blind 900 may be left in this position to air dry. Finally, the mini-blind 900 may be supported by hand while one or the other of the blind brackets 530 is pulled down and slid away from the mini-blind 900. The mini-blind 900 may then be removed from the other one of the blind brackets 530 and returned to the window from where it was removed.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A mini-blind cleaner comprising:
a left side frame, a right side frame and a top frame;
wherein the mini-blind cleaner is a framework upon which a mini-blind is hung for access to both sides while being cleaned;

wherein two blind holder mechanisms on the top frame adjust the separation of blind brackets to accommodate blinds of different sizes;

wherein the left side frame and the right side frame are telescopic and hinged so that the mini-blind cleaner collapses and folds for storage and transportation.

2. The mini-blind cleaner according to claim 1
wherein the left side frame comprises a left front upright, a left rear upright, a left frame base, a left front foot, a left rear foot, a left front hinge and a left rear hinge;
wherein the left frame base is an inverted, U-shaped element at the bottom of the left side frame;
wherein the two ends of the left frame base couple to the left front foot and to the left rear foot;
wherein when the mini-blind cleaner is being used, the left front foot and the left rear foot rest on the ground;
wherein the length of the horizontal part of the left frame base is 50% to 100% of the height of the left front upright to give the mini-blind cleaner stability when it is being used.

3. The mini-blind cleaner according to claim 2
wherein the left front upright is a telescopic leg;
wherein the left front upright couples to the left frame base on a bottom end of the left front upright;
wherein the left front upright hingedly couples to the top frame on a top end of the left front upright;
wherein the left rear upright is a telescopic leg;
wherein the left rear upright couples to the left frame base on a bottom end of the left rear upright;
wherein the left rear upright couples to the top frame on a top end of the left rear upright;
wherein the left front upright and the left rear upright comprises two or more segments in each telescopic leg.

4. The mini-blind cleaner according to claim 3
wherein the left front upright and the left rear upright each have a height of 5 to 6 ft when fully extended;
wherein the left front upright and the left rear upright each have a height of 12 to 36 inches when fully collapsed;
wherein the left front upright and the left rear upright each comprise 2 to 5 telescopic leg segments.

5. The mini-blind cleaner according to claim 4
wherein the top of the left front upright is hingedly coupled to the left, front corner of the top frame by the left front hinge;
wherein the top of the left rear upright is hingedly coupled to the left, rear corner of the top frame by the left rear hinge;
wherein the left side frame is reduced in size by collapsing the left front upright and the left rear upright using the telescopic joints;
wherein the left side frame is folded by rotating the left side frame around the left front hinge and the left rear hinge towards the top frame.

6. The mini-blind cleaner according to claim 5
wherein the right side frame comprises a right front upright, a right rear upright, a right frame base, a right front foot, a right rear foot, a right front hinge and a right rear hinge;
wherein the right frame base is an inverted, U-shaped element at the bottom of the right side frame;
wherein the two ends of the right frame base couple to the right front foot and to the right rear foot;
wherein when the mini-blind cleaner is being used, the right front foot and the right rear foot rest on the ground;
wherein the length of the horizontal part of the right frame base is 50% to 100% of the height of the right front upright to give the mini-blind cleaner stability when it is being used.

7. The mini-blind cleaner according to claim 6
wherein the right front upright is a telescopic leg;
wherein the right front upright couples to the right frame base on a bottom end of the right front upright;
wherein the right front upright hingedly couples to the top frame on a top end of the right front upright;
wherein the right rear upright is a telescopic leg;
wherein the right front upright couples to the right frame base on a bottom end of the right rear upright;
wherein the right front upright hingedly couples to the top frame on a top end of the right rear upright;
wherein the right front upright and the right rear upright comprises two or more segments in each telescopic leg.

8. The mini-blind cleaner according to claim 7
wherein the right front upright and the right rear upright each have a height of 5 to 6 ft when fully extended;
wherein the right front upright and the right rear upright each have a height of 12 to 36 inches when fully collapsed;
wherein the right front upright and the right rear upright each comprise 2 to 5 telescopic leg segments.

9. The mini-blind cleaner according to claim 8
wherein the spacing between the points on the left frame base where the left front upright and the left rear upright couple to the left frame base matches a depth of the top frame;
wherein the spacing between the points on the right frame base where the right front upright and the right rear upright couple to the right frame base matches the depth of the top frame.

10. The mini-blind cleaner according to claim 9
wherein the top of the right front upright is hingedly coupled to the right, front corner of the top frame by the right front hinge;
wherein the top of the right rear upright is hingedly coupled to the right, rear corner of the top frame by the right rear hinge;
wherein the right side frame is reduced in size by collapsing the right front upright and the right rear upright using the telescopic joints;
wherein the right side frame is folded by rotating the right side frame around the right front hinge and the right rear hinge towards the top frame.

11. The mini-blind cleaner according to claim 10
wherein the top frame comprises a front frame bar, a rear frame bar, a left frame bar, a right frame bar and a center bar;
wherein the top frame is supported off the ground by the left side frame and the right side frame;
wherein the front frame bar, the rear frame bar, the left frame bar, and the right frame bar form an outer frame that couples to the left side frame and the right side frame;
wherein the outer frame provides rigidity for the mini-blind cleaner;
wherein the length of the left frame bar and the right frame bar determine the depth of the top frame;
wherein the length of the front frame bar and the rear frame bar determine a width of the top frame.

12. The mini-blind cleaner according to claim 11
wherein the depth of the top frame is between 24 and 64 inches;

wherein the width of the top frame is between 48 and 72 inches.

13. The mini-blind cleaner according to claim 11
wherein the mini-blind that is being cleaned is suspended from the center bar;
wherein the ends of the center bar couple to the center of the left frame bar and to the center of the right frame bar;
wherein the center bar is located midway between the front frame bar and the rear frame bar;
wherein the center bar runs parallel to the front frame bar and to the rear frame bar.

14. The mini-blind cleaner according to claim 13
wherein the center bar comprises the two blind holder mechanisms;
wherein one of the two blind holder mechanisms is located at the center of the left half of the center bar;
wherein the other one of the two blind holder mechanisms is located at the center of the right half of the center bar;
wherein each of the two blind holder mechanisms are identical except for being reversed left-to-right due to their opposing positions on the center bar.

15. The mini-blind cleaner according to claim 14
wherein each of the two blind holder mechanisms individually comprise a pin slot, an adjustment pin, a spring, the blind bracket, and a plurality of adjustment stops;
wherein the pin slot is a linear cutout along a longitudinal axis of the center bar;
wherein the pin slot is open from top to bottom;
wherein the adjustment pin slides along the center bar within the extent of the pin slot;
wherein a length of the pin slot is measured from one end of the pin slot to the other end of the pin slot along the longitudinal axis of the center bar;
wherein a width of the pin slot is measured from one side of the pin slot to the other side of the pin slot in a direction that is perpendicular to the longitudinal axis of the center bar and oriented front-to-back;
wherein the plurality of adjustment stops are disposed along the pin slot;
wherein each of the plurality of adjustment stops comprise an indentation in the center bar open from below and centered on a location along the pin slot.

16. The mini-blind cleaner according to claim 15
wherein the adjustment pin comprises an adjustment pin head and an adjustment pin shaft;
wherein the adjustment pin head has a diameter that is wider than the width of the pin slot;
wherein the adjustment pin head prevents the adjustment pin from falling through the pin slot;
wherein the adjustment pin shaft is narrower than the width of the pin slot and therefore moves along the pin slot;
wherein the adjustment pin shaft extends downward from the adjustment pin head to the blind bracket, passing through the pin slot;
wherein the bottom of the adjustment pin shaft is coupled to the top of the blind bracket;
wherein the spring encircles the blind bracket between the adjustment pin head and the blind bracket.

17. The mini-blind cleaner according to claim 16
wherein the spring lifts the adjustment pin;
wherein the adjustment pin lifts the blind bracket;
wherein a lock extension on the blind bracket engages one of the indentations of the plurality of adjustment stops when the blind bracket is lifted;
wherein the blind bracket is moved by pulling down on the blind bracket, sliding it to a pre-defined position where one of the indentations has been placed, and releasing the blind bracket;
wherein the spring pulls the blind bracket up and the lock extension seats in the indentation;
wherein the blind bracket will not slide while the lock extension is seated in the indentation.

18. The mini-blind cleaner according to claim 17
wherein the blind bracket comprises a blind receiver and the lock extension;
wherein the blind receiver is a hollow cube with one vertical side missing;
wherein the missing vertical side is oriented towards the center of the mini-blind cleaner;
wherein the end of the mini-blind is slid into the blind receiver and is supported by the blind receiver;
wherein two of the blind brackets, one on the left side of the center bar and one on the right side of the center bar, are positioned at a specific separation distance corresponding to the length of the mini-blind;
wherein the mini-blind is held at both ends by the blind brackets and the mini-blind is suspended from the center bar.

19. The mini-blind cleaner according to claim 18
wherein the lock extension is a cylindrical upward extension of the blind bracket;
wherein the diameter of the lock extension is smaller than the diameter of the indentation in the plurality of adjustment stops.

20. The mini-blind cleaner according to claim 19
wherein the plurality of adjustment stops comprises two or more of the indentations at predetermined positions along the pin slot;
wherein the predetermined positions are selected so that the distance between a specific one of the indentations on the left side of the center bar and a complementary one of the indentations on the right side of the center bar corresponds to a standard length of a mini-blind.

* * * * *